United States Patent [19]

Wick

[11] 3,927,043

[45] Dec. 16, 1975

[54] BIS-(POLYHALOGENOANILINO)-ANTHRAQUINONES

[75] Inventor: Arnold Wick, Therwil, Switzerland

[73] Assignee: Ciba-Geigy Corporation, Ardsley, N.Y.

[22] Filed: Apr. 17, 1974

[21] Appl. No.: 461,567

[30] Foreign Application Priority Data

Apr. 19, 1973 Switzerland.......................... 5756/73

[52] U.S. Cl. .............................. 260/381; 8/39; 8/40
[51] Int. Cl.² ...................... C07C 97/25; C09B 1/16
[58] Field of Search ..................................... 260/381

[56] References Cited

UNITED STATES PATENTS

| | | |
|---|---|---|
| 3,444,214 | 5/1969 | Buecheler ....................... 260/381 X |
| 3,666,778 | 5/1972 | Hohmann et al. ............... 260/381 X |
| 3,752,646 | 8/1973 | Blackwell........................ 260/381 X |
| 3,752,647 | 8/1973 | Mentzer........................... 260/381 X |
| 3,797,995 | 3/1974 | Renfrew et al. ................ 260/381 X |

Primary Examiner—Paul F. Shaver
Attorney, Agent, or Firm—Vincent J. Cavalieri

[57] ABSTRACT

Bis-(polyhalogenoanilino)-anthraquinones and their use for the bulk dyeing of high molecular organic compounds.

7 Claims, No Drawings

BIS-(POLYHALOGENOANILINO)-ANTHRAQUINONES

It has been found that bis-(halogenophenylamino)-anthraquinones of the formula

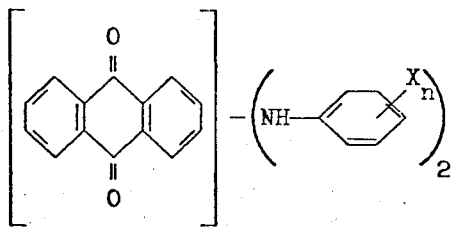

wherein X denotes a halogen atom and n denotes a number from 2 to 5, are outstandingly suitable for the bulk dyeing of high molecular organic compounds.

Particular interest attaches to $\alpha,\alpha'$-bis-(halogenophenylamino)-anthraquinones of the indicated formula, and especially to those of the formula

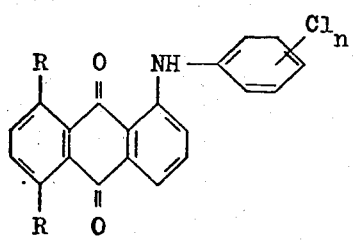

wherein one of the radicals R denotes a group of the formula

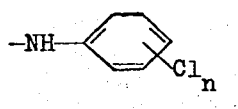

and the other denotes a hydrogen atom, and n denotes a number from 2 to 5.

The manufacture of isomer mixtures of $\alpha,\alpha'$-bis-(dichlorophenylamino)-anthraquinones by reaction of 1,4-, 1,5- or 1,8-diaminoanthraquinone with 1,2,4-trichlorobenzene has already been described in Example 1 of French Patent Specification 1,571,171.

The bis-(polyhalogenophenylamino)-anthraquinones of the formula

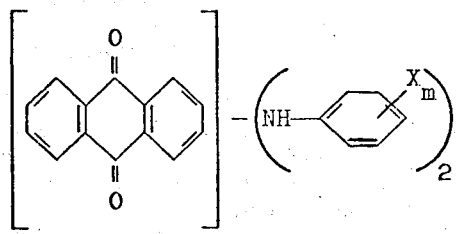

wherein X denotes a halogen atom and m denotes the number 3, 4 or 5, are new compounds. Amongst these, the $\alpha,\alpha'$-bis-(polyhalogenophenylamino)-anthraquinones are of particular interest.

Preferred compounds are those of the formula

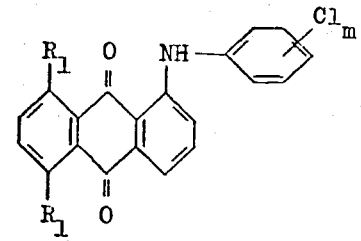

wherein one $R_1$ denotes a group of the formula

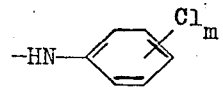

and the other denotes a hydrogen atom and m denotes the number 3, 4 or 5, and especially those of the formula

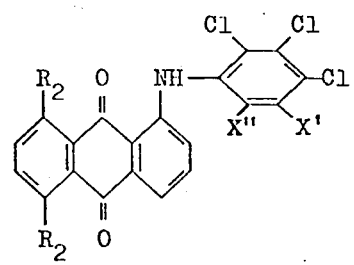

wherein one $R_2$ denotes the radical

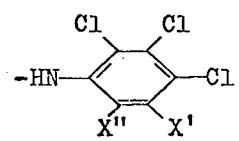

and the other denotes a hydrogen atom and X' and/or X" denotes a hydrogen atom or chlorine atom. Because of their sparing solubility in organic media, these compounds can be used as pigments.

The bis-(halogenophenylamino)-anthraquinones can be obtained by condensation, in the molar ratio of 1:2, of a dihalogenoanthraquinone with a polyhalogenoaniline of the formula

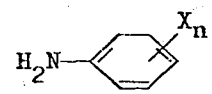

wherein X and n have the indicated meaning, or at times also by condensation particular a diaminoanthraquinone with a suitable polyhalogenobenzene. Halgoen is in particlar to be understood to mean chlorine and bromine.

Preferably, $\alpha,\alpha'$-dihalogenoanthraquinones and, for example, 1,4- or 1,8-, but especially 1,5-dichloroanthraquinone, are used as the starting compounds. Suitable polyhalogenoanilines to be used are those of the formula

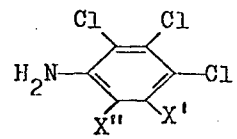

in which X' and/or X" denotes hydrogen or chlorine.

The reaction is preferably carried out in an inert high-boiling organic solvent such as nitrobenzene, in the presence of an acid-binding agent, such as of the alkali metal salts of weak acids, for example sodium acetate, sodium carbonate or potassium carbonate, and of a catalyst, for example of copper compound, such as cuprous chloride. Particularly suitable catalysts prove to be the addition compounds of cuprous iodide with pyridine bases, that is to say pyridine and related compounds, such as picolines, lutidines, collidines, quinoline or isoquinoline. Suitably, 0.1–0.5 mol of the catalyst is used per replaceable halogen atom.

The reaction is suitably carried out at elevated temperatures, for example at between 120° and 250°.

In the same way it is also possible to obtain, by condensation of $\alpha,\alpha'$-dihalogenoanthraquinones, especially of 1,5-dichloroanthraquinone, with a pure dihalogenoaniline, especially with 2,5-dichloroaniline, the isomer-free $\alpha,\alpha'$-bis-(dihalogenophenylamino)-anthraquinones of the general formula

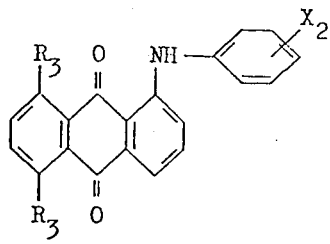

wherein X denotes halogen atoms, preferably chlorine atoms, and one $R_3$ denotes the

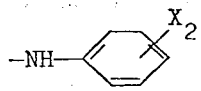

radical and the other denotes a hydrogen atom, and the two X atoms in the two radicals

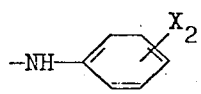

occupy identical positions relative to the NH group; these compounds were not known previously as the pure substances.

In contrast to the known isomer mixtures of the $\alpha,\alpha'$-bis-(dihalogenophenylamino)-anthraquinone series, these pure substances include some which, because of their surprising sparing solubility in organic media, can be used as pigments, especially those of the formula

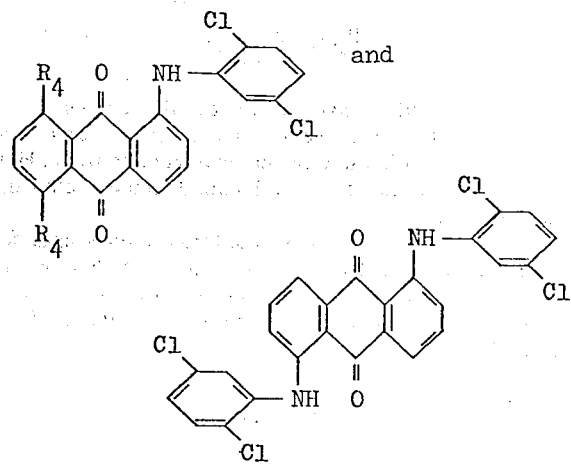

wherein one $R_4$ denotes the radical

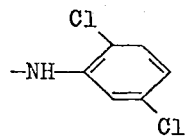

and the other denotes a hydrogen atom.

The following may be mentioned as high molecular organic compounds which can be dyed with the dyestuffs according to the invention: cellulose ethers and cellulose esters, such as ethylcellulose, nitrocellulose, cellulose acetate, cellulose butyrate, polyamides and polyurethanes or polyesters, natural resins or synthetic resins, such as polymerisation resins or condensation resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile, polyacrylic acid esters, rubber, casein, silicone and silicone resins, individually or as mixtures.

It is immaterial whether the high molecular compounds mentioned are in the form of plastic masses or melts or in the form of spinning solutions, lacquers, especially lacquers giving a metallic effect, paints or printing inks.

In the case of those of the dyestuffs according to the invention which represent pigments it is advisable to convert these into a finely divided form, for example by suitable mechanical working, for example grinding or kneading in the presence of salts, before incorporating them into the high molecular compounds. Instead of the pure pigments, pigment preparations can also be used.

Those of the dyestuffs according to the invention which are soluble in organic media are preferentially suitable for the bulk dyeing of spinnable polymers, for example of polyolefines, or especially of linear polyesters.

As linear polyesters there may especially be mentioned those which are obtained by polycondensation of terephthalic acid or its esters with glycols of the formula HO—$(CH_2)_n$—OH, wherein n denotes the numbers 2–10, or with 1,4-di(hydroxymethyl)-cyclohexane, or by polycondensation of glycol ethers of hydroxybenzoic acids, for example p-($\beta$-hydroxyethoxy)-benzoic acid. The term linear polyesters also encompasses copolyesters which are obtained by partial replacement of the terephthalic acid by another dicarboxylic acid or by a hydroxycarboxylic acid and/or by partial replacement of the glycol by another diol.

However, the polyethylene terephthalates are of particular interest.

The linear polyesters to be dyed are preferably intimately mixed, in the form of powders, chips or granules, with the dyestuff. This can be effected, for example, by sprinkling the finely divided dry dyestuff powder onto the polyester particles or by treating the polyester particles with a solution or dispersion of the dyestuff in an organic solvent and then removing the solvent.

Finally, the colouring substance can also be added directly to the fused polyester or be added before or during the polycondensation of the polyethylene terephthalate.

The ratio of dyestuff to polyester can vary within wide limits, depending on the desired depth of colour. In general, it is advisable to use from 0.01 to 2 parts of dyestuff per 100 parts of polyester.

The polyester particles treated in this way are fused in an extruder in accordance with known processes and extruded to give articles, especially films or fibres, or cast to form sheets.

Evenly and intensely dyed articles of high fastness to light are obtained. The dyed fibres obtainable according to the process are furthermore distinguished by outstanding fastness to wet cleaning and to dry cleaning.

A particular advantage of the dyestuffs to be used according to the invention is that they dissolve in the polyester melt and, surprisingly, withstand high temperatures of up to 300°C without decomposing, so that substantially clearer dyeings are obtained than when using insoluble pigments.

In the examples which follow the parts, unless otherwise noted, denote parts by weight, and the percentages denote percentages by weight.

EXAMPLES 1 – 3

Non-delustered polyethylene terephthalate granules suitable for the manufacture of fibres are shaken with 1% of the isomer mixture of 1,5-bis-(dichloroanilino)-anthraquinone, obtainable according to French Patent Specification 1,571,171, Example 2, in a container which can be closed, for 15 minutes on a shaking machine. The uniformly dyed granule particles are spun on a melt spinning installation (285°C + 3°C, dwell time in the spinning machine approx. 5 minutes) to give filaments which are stretched on a stretching and twisting installation, and are wound up. Because of the solubility of the dyestuff in polyethylene terephthalate a vivid red dyeing is obtained, which is distinguished by outstanding fastness to light, excellent fastness to washing, dry cleaning, cross-dyeing and sublimation, and high stability to chlorite bleach.

Similar results are obtained if instead of the above isomer mixture one of the following dyestuffs is employed:

| Example | Dyestuff | Colour shade |
|---|---|---|
| 2 | Isomer mixture of 1,4-bis(dichloroanilino)-anthraquinone, prepared according to French Patent Specification 1,571,171, Example 1 | dark blue |
| 3 | Isomer mixture analogous to French Patent Specification 1,571,171, Example 2, but prepared from 1,8-diaminoanthraquinone and 1,2,4-trichlorobenzene | claret |

EXAMPLES 4–19

A solution of 0.5 part of copper-I iodide in 1.5 parts of 3,4-picoline is added to a mixture of 28.3 parts of 1,5-dichloroanthraquinone, 49 parts of 2,5-dichloroaniline, 18 parts of anhydrous sodium carbonate and 280 parts of nitrobenzene, and the mixture is then stirred for 16 hours at 200°–210°C whilst distilling off the water which forms during the reaction.

The reaction product, which separates out in a crystalline form, is filtered off at 80°C, washed first with nitrobenzene at 80°C, then with boiling ethanol and finally thoroughly with hot water and dried at 90°C in vacuo. 41 parts of crystalline pure 1,5-bis-(2,5-dichloroanilino)-anthraquinone are obtained, corresponding to a yield of 78%; the compound dyes polyester material in accordance with Example 1 in bluish-tinged red shades.

If, analogously to the above example, 2,5-dichloroaniline is condensed with 1,5-dichloroanthraquinone in the presence of a mixture of 0.5 part of copper powder and 0.5 part of copper-I chloride as the catalyst, instead of the copper-I iodide/picoline complex, only 12 parts of 1,5-bis-(2,5-dichloroanilino)anthraquinone are obtained, corresponding to a yield of only 23%.

If, analogously to Example 4, equivalent amounts of other suitable dichloroanthraquinones and dichloroanilines are condensed with one another instead of 1,5-dichloroanthraquinone and 2,5-dichloroaniline, the pure bis-(dichloroanilino)-anthraquinones listed in the table which follows can be manufactured, which bulk-dye polyester material, analogously to Example 1, to give the shades indicated:

| Ex. | Dyestuff | Colour shade |
|---|---|---|
| 5 | 1,4-bis-(2,5-dichloroanilino)-anthraquinone | dark blue |
| 6 | 1,8-bis-(2,5-dichloroanilino)-anthraquinone | claret |
| 7 | 1,4-bis-(2,3-dichloroanilino)-anthraquinone | dark blue |
| 8 | 1,5-bis-(2,3-dichloroaniline)-anthraquinone | red |
| 9 | 1,8-bis-(2,3-dichloroanilino)-anthraquinone | claret |
| 10 | 1,4-bis-(2,4-dichloroanilino)-anthraquinone | dark blue |
| 11 | 1,5-bis-(2,4-dichloroanilino)-anthraquinone | red |
| 12 | 1,8-bis-(2,4-dichloroanilino)-anthraquinone | violet |
| 13 | 1,4-bis-(3,4-dichloroanilino)-anthraquinone | dark blue |
| 14 | 1,5-bis-(3,4-dichloroanilino)-anthraquinone | red |
| 15 | 1,8-bis-(3,4-dichloroanilino)-anthraquinone | violet |
| 16 | 1,4-bis-(3,5-dichloroanilino)-anthraquinone | dark blue |
| 17 | 1,5-bis-(3,5-dichloroanilino)-anthraquinone | red |
| 18 | 1,8-bis-(3,5-dichloroanilino)-anthraquinone | red |
| 19 | 1,5-bis-(2,5-dibromoanilino)-anthraquinone | red |

EXAMPLE 20

A mixture of 2.4 parts of 1,5-diaminoanthraquinone, 5 parts of 2,5-dichlorobromobenzene, 1.8 parts of anhydrous sodium carbonate and 0.2 part of copper-I chloride in 80 parts of nitrobenzene is stirred for 20 hours at 175°C. After working up analogously to Example 4 and removing the copper salts by washing with 5% strength hydrochloric acid, 4.1 parts of crystalline 1,5-bis-(2,5-dichloroanilino)-anthraquinone are obtained, the compound corresponding to the material obtained according to Example 4.

If, in the above example, equivalent amounts of 2,4-dichlorobromobenzene are used instead of 2,5-dichlorobromobenzene for condensation with 1,5-diaminoanthraquinone, the 1,5-bis-(2,4-dichloroanilino)-anthraquinone dichloroanilino)-anthraquinone already mentioned in Example 11 is obtained.

EXAMPLES 21–24

65 parts of stabilised polyvinyl chloride, 35 parts of dioctyl phthalate and 0.2 part of the colourant obtained according to Example 4 are stirred together and the mixture is then milled for 7 minutes at 140°C on a two-roll calender. A film, dyed bluish-tinged red, of good transparency and good fastness to migration, and outstanding fastness to light, is obtained.

If instead of 1,5-bis-(2,5-dichloroanilino)-anthraquinone the bis-(dichloroanilino)-anthraquinones mentioned below are used for pigmenting PVC analogously to Example 21, the colour shades indicated in the table which follows are obtained, which have similar fastness properties.

| Example | Dyestuff | Colour shade |
|---|---|---|
| 22 | 1,8-bis-(2,5-dichloroanilino)-anthraquinone | claret |
| 23 | 1,5-bis-(2,4-dichloroanilino)-anthraquinone | red |
| 24 | 1,5-bis-(3,5-dichloroanilino)-anthraquinone | claret |

EXAMPLES 25–28

10 g of titanium dioxide and 2 g of 1,5-bis-(2,5-dichloroanilino)-anthraquinone manufactured according to Example 4 are ground with 88 g of a mixture of 26.4 g of coconut alkyd resin, 24.0 g of melamine-formaldehyde resin (50% solids content), 8.8 g of ethylene glycol monomethyl ether and 28.8 g of xylene for 48 hours in a ball mill.

If this lacquer is sprayed onto an aluminium foil, pre-dried for 30 minutes at room temperature and then stoved for 30 minutes at 120°C, a bluish-tinged red lacquering is obtained, which has good depth of colour and is distinguished by good fastness to overlacquering and outstanding fastness to light and to weathering.

If instead of 1,5-bis-(2,5-dichloroanilino)-anthraquinone the bis-(dichloroanilino)-anthraquinones mentioned below are applied in the lacquer according to Example 25, the test shades indicated in the table which follows are obtained; these have similar fastness properties.

| Example | Dyestuff | Colour shade |
|---|---|---|
| 26 | 1,8-bis-(2,5-dichloroanilino)-anthraquinone | claret |
| 27 | 1,5-bis-(2,4-dichloroanilino)-anthraquinone | red |
| 28 | 1,5-bis-(3,5-dichloroanilino)-anthraquinone | claret |

EXAMPLE 29

1,000 parts of polyethylene terephthalate granules, 10 parts of titanium oxide (Kronos RN 40) and 1 part of 1,5-bis-(2,5-dichloroanilino)-anthraquinone according to Example 4 are mixed in a closed container on a roll stand for 2 hours. The dyed granules are extruded at approx. 260°C to give strands of 2 mm diameter, which are regranulated. The granules obtained are injection-moulded in an Anker screw injection moulding machine at 270°–280°C to produce mouldings. A delustered moulding, dyed bluish-tinged red, of very good fastness to light, is obtained.

EXAMPLE 30

Non-delustered polyethylene terephthalate granules suitable for the manufacture of fibres are shaken with 1% of one of the bis-(polyhalogenoanilino)-anthraquinones described below, in a container which can be closed, for 15 minutes on a shaking machine. The uniformly dyed granule particles are spun on a melt spinning installation (285°C + 3°C, dwell time in the spinning machine approx. 5 minutes) to give filaments which are stretched on a stretching and twisting installation, and are wound up. Because of the solubility of the dyestuffs in polyethylene terephthalate, vivid dyeings are obtained, which are distinguished by outstanding fastness to light, excellent fastness to washing, dry cleaning, cross-dyeing and sublimation and high stability to chlorite bleach.

EXAMPLE 31

1,000 parts of polyethylene terephthalate granules, 10 parts of titanium oxide (Kronos RN 40) and 1 part of one of the bis-(polyhalogenoanilino)-anthraquinones described below are mixed in a closed container on a roll stand for 2 hours. The dyed granules are extruded at approx. 260°C to give strands of 2 mm diameter, which are regranulated. The granules obtained are injection-moulded in an Anker screw injection moulding machine at 270°–280°C to produce mouldings.

EXAMPLE 32

0.5 part of copper-I iodide dissolved in 1.5 parts of 3,4-picoline are added to a mixture of 59 parts of 2,4,5-trichloroaniline, 28 parts of 1,5-dichloroanthraquinone and 18 parts of anhydrous sodium carbonate in 280 parts of nitrobenzene and the mixture is then stirred for 17 hours at 200°–210°C whilst distilling off the water which forms during the reaction.

The reaction product which separates out as crystals is filtered off at 80°C and is washed first with nitrobenzene at 80°C, then with boiling ethanol and finally thoroughly with hot water and dried at 90°C in vacuo.

42 parts of crystalline, pure 1,5-bis-(2,4,5-trichloroanilino)-anthraquinone are obtained, corresponding to a yield of 70%; the compound dyes polyester, in accordance with the bulk dyeing methods of Examples 29 and 30, in red shades having excellent fastness properties.

EXAMPLES 33–41

If, analogously to Example 32, equivalent amounts of other suitable trichloroanilines and dichloroanthraquinones are used instead of 2,4,5-trichloroaniline and 1,5-dichloroanthraquinone, the bis-(trichloroanilino)-anthraquinones listed in the table which follows are obtained analogously; they dye polyester material, analogously to Example 30 and 31, in the indicated colour shades.

| Ex. | Dyestuff | Colour shade |
|---|---|---|
| 34 | 1,5-bis-(2,3,4-trichloroanilino)-anthraquinone | red |
| 35 | 1,5-bis-(3,4,5-trichloroanilino)-anthraquinone | claret |
| 36 | 1,4-bis-(2,3,4-trichloroanilino)-anthraquinone | dk blue |
| 37 | 1,4-bis-(2,4,5-trichloroanilino)-anthraquinone | dk blue |
| 38 | 1,4-bis-(3,4,5-trichloroanilino)-anthraquinone | dk blue |
| 39 | 1,8-bis-(2,3,4-trichloroanilino)-anthraquinone | bluish-tinged red |
| 40 | 1,8-bis-(2,4,5-trichloroanilino)-anthraquinone | claret |
| 41 | 1,8-bis-(3,4,5-trichloroanilino)-anthraquinone | claret |

EXAMPLES 42–44

A solution of 0.1 part of copper-I iodide in 0.3 part of 3,4-picoline is added to a mixture of 5.6 parts of 1,5-dichloroanthraquinone, 13.8 parts of 2,3,4,5-tetrachloroaniline, 3.6 parts of anhydrous sodium carbonate and 50 parts of nitrobenzene and the mixture is then stirred for 4 hours at 200°–210°C whilst distilling off the water of reaction. The colourant which separates out in the form of crystals is then isolated at 80°C analogously to Example 32, and is worked up further. 10.7 parts of crystalline 1,5-bis-(2,3,4,5-tetrachloroanilino)-anthraquinone are obtained, corresponding to a yield of 80%; the compound dyes polyester material, analogously to Examples 30 and 31, in fast claret shades.

If, analogously to Example 42, equivalent amounts of other suitable dichloroanthraquinones are used, instead of 1,5-dichloroanthraquinone, for condensation with 2,3,4,5-tetrachloroaniline, the bis-(2,3,4,5-tetrachloroanilino)-anthraquinones listed below are obtained:

| Example | Dyestuff | Colour shade |
|---|---|---|
| 43 | 1,4-bis-(2,3,4,5-tetrachloroanilino)-anthraquinone | dk blue |
| 44 | 1,8-bis-(2,3,4,5-tetrachloroanilino)-anthraquinone | violet |

EXAMPLES 45–48

65 parts of stabilised polyvinyl chloride, 35 parts of dioctyl phthalate and 0.2 part of the dyestuff obtained according to Example 34 are stirred together and the mixture is then milled for 7 minutes at 140°C on a two-roll calender. A film, dyed bluish-tinged red, of good transparency and good fastness to migration, and outstanding fastness to light, is obtained.

If instead of 1,5-bis-(2,3,4-trichloroanilino)-anthraquinone the bis-(polychloroanilino)-anthraquinones mentioned below are used for pigmenting PVC analogously to Example 45, the colour shades indicated in the table which follows are obtained, which have similar fastness properties.

| Example | Dyestuff | Colour shade |
|---|---|---|
| 46 | 1,8-bis-(2,3,4,5-trichloroanilino)-anthraquinone | bluish-tinged red |
| 47 | 1,5-bis-(2,3,4,5-tetrachloroanilino)-anthraquinone according to Example 42 | red |
| 48 | 1,8-bis-(2,3,4,5-tetrachloroanilino)-anthraquinone according to Example 44 | violet |

EXAMPLE 49

10 g of titanium dioxide and 2 g of 1,5-bis-(2,3,4-trichloroanilino)-anthraquinone manufactured according to Example 34 are ground with 88 g of a mixture of 26.4 g of coconut alkyd resin, 24.0 g of melamine-formaldehyde resin (50% solids content), 8.8 g of ethylene glycol monomethyl ether and 28.8 g of xylene for 48 hours in a ball mill.

If this lacquer is sprayed onto an aluminium foil, pre-dried for 30 minutes at room temperature and then stoved for 30 minutes at 120°C, a bluish-tinged red lacquering is obtained, which has good depth of colour and is distinguished by good fastness to overlacquering and outstanding fastness to light and to weathering.

EXAMPLES 50–53

If instead of 1,5-bis-(2,3,4-trichloroanilino)-anthraquinone the compounds mentioned below are used, the colour shades indicated in the table which follows, which have similar properties, are obtained:

| Example | Dyestuff | Colour shade |
|---|---|---|
| 51 | 1,8-bis-(2,3,4-trichloroanilino)-anthraquinone according to Example 39 | bluish-tinged red |
| 52 | 1,5-bis-(2,3,4,5-tetrachloroanilino)-anthraquinone according to Example 42 | red |
| 53 | 1,8-bis-(2,3,4,5-tetrachloroanilino)-anthraquinone according to Example 44 | violet |

EXAMPLE 54

A mixture of 11.9 parts of 1,5-diaminoanthraquinone, 32 parts of 1,2,4,5-tetrachlorobenzene, 12.5 parts of anhydrous sodium acetate, 0.5 part of copper powder, 0.5 part of copper-I chloride and 150 parts of nitrobenzene is stirred for 4 hours at 200°–210°C whilst distilling off acetic acid and is then isolated analogously to Example 4. To remove copper salts and residual amounts of solvent, the reaction product, in 1,000 parts of 5% strength hydrochloric acid, is subjected to steam distillation, and the product is filtered off hot, washed until neutral and dried in vacuo at 80°C. 23 parts of a dark red product are obtained, of which the properties, as a colourant for the bulk dyeing of polyester, largely correspond to 1,5-bis-(2,4,5-trichloroanilino)-anthraquinone according to Example 32.

EXAMPLES 55–57

1 part of ground 1,5-bis-(2,5-dichloroanilino)-anthraquinone according to Example 4 is stirred into 83 parts of a clear laquer consisting of 47 parts of Epok D 2102 (approx. 60% strength solution of a heat-curable acrylic copolymer — requiring an external cross-linking agent — in 1:1, butanol:xylene, from BP Chemicals International Ltd.), 22 parts of Maprenal TTX (approx. 55% strength solution of a melamine resin in butanol/xylene, from Cassella Farbwerke AG), 6 parts of ethylglycol acetate and 25 parts of xylene, and the mixture is ground for 72 hours in a ball mill, and discharged. 1.67 parts of a 60% strength aluminium bronze paste (Alcoa 726) are added to 84 parts of the coloured lacquer obtained and the mixture is left to stand for some time with occasional stirring, and is then stirred up well. The finished lacquer is sieved, diluted to the spraying viscosity and applied to primed metal sheets by spraying. The samples are stoved for 30 minutes at 140°C. A claret-coloured metallic-effect lacquering is obtained, which is distinguished by very good fastness to weathering.

If instead of 1,5-bis-(2,5-dichloroanilino)-anthraquinone the 1,5-bis-(polychloroanilino)-anthraquinones listed below are used for application in the metallic-effect lacquer according to Example 55, the shades indicated in the table are obtained, which are distinguished by analogous fastness properties.

| Ex. No. | Bis-(polychloroanilino)-anthraquinone | Shade in the metallic-effect lacquer |
|---|---|---|
| 56 | 1,5-bis-(2,3,4-trichloroanilino)-anthraquinone | claret |
| 57 | 1,5-bis-(2,3,4,5-tetrachloroanilino)-anthraquinone | claret |

EXAMPLE 58

28 parts of 1,5-dichloroanthraquinone are condensed with 66.5 parts of pentachloroaniline in 500 parts of nitrobenzene, analogously to Example 4. 52 parts of brown-yellow 1,5-bis-(pentachloroanilino)-anthraquinone are obtained; when this is used as a pigment in plastics and lacquers it gives reddish-tinged yellow colour shades of good fastness properties.

What we claim is:

1. Bis-(polyhalogenoanilino)-anthraquinones of the formula

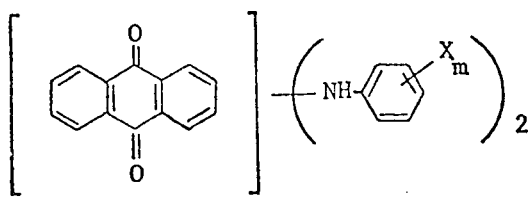

wherein X denotes a halogen atom and $m$ denotes the number 3, 4 or 5.

2. $\alpha,\alpha'$-Bis(polychloroanilino)-anthraquinones according to claim 1.

3. 1,5-Bis-(2',5'-dichloroanilino)-anthraquinone in the pure isomer-free form.

4. Bis-(polychloroanilino)-anthraquinones according to claim 1, of the formula

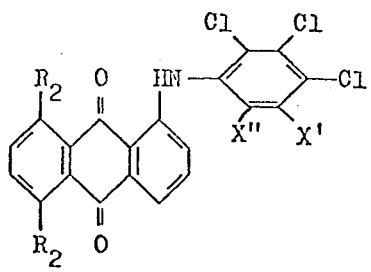

wherein one $R_2$ denotes the radical

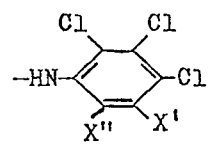

the other denotes a hydrogen atom and X' and/or X'' denotes a hydrogen atom or a chlorine atom.

5. 1,5-Bis-(2',3',4'-trichloroanilino)-anthraquinone.

6. 1,5-Bis-(2',3',4',5'-tetrachloroanilino)-anthraquinone.

7. 1,5-Bis-(pentachloroanilino)-anthraquinone.

* * * * *